United States Patent [19]

Richter

[11] 4,140,226

[45] Feb. 20, 1979

[54] INDUSTRIAL ROBOT

[75] Inventor: Hans Richter, Augsburg, Fed. Rep. of Germany

[73] Assignee: H. A. Schlatter AG, Schlieren, Switzerland

[21] Appl. No.: 806,899

[22] Filed: Jun. 15, 1977

[30] Foreign Application Priority Data

Jun. 18, 1976 [DE] Fed. Rep. of Germany ....... 2627490

[51] Int. Cl.² ............................................. B25J 11/00
[52] U.S. Cl. ............................. 214/1 BD; 214/147 T; 214/DIG. 10
[58] Field of Search ................. 214/1 B, 1 BB, 1 BD, 214/1 BT, 1 BV, 1 CM, 146.5, 147 T, 770, 773, DIG. 10

[56] References Cited

U.S. PATENT DOCUMENTS

| Re. 28,437 | 6/1975 | DeVol et al. | 214/147 TX |
|---|---|---|---|
| 2,061,358 | 11/1936 | Hunter | 214/DIG. 10 |
| 3,587,872 | 6/1971 | Pauly | 214/1 CM X |
| 3,703,968 | 11/1972 | Uhrich et al. | 214/1 CM X |
| 3,826,383 | 7/1974 | Richter | 214/1 BV X |

FOREIGN PATENT DOCUMENTS 2433954  1/1976  Fed. Rep. of Germany ....... 214/1 BD

Primary Examiner—L. J. Paperner
Attorney, Agent, or Firm—Pollock, Vande Sande & Priddy

[57] ABSTRACT

The present invention relates to an industrial robot with a boom having a clasping member at its front end. The boom is connected with two levers wherein one lever is connected via rotary joints with the boom and with a support plate carrying the boom and the levers. The other lever is connected via rotary joints on the one hand with the boom and on the other hand with a pivoting lever wherein the latter is pivotally carried on the support plate.

7 Claims, 1 Drawing Figure

U.S. Patent
Feb. 20, 1979
4,140,226
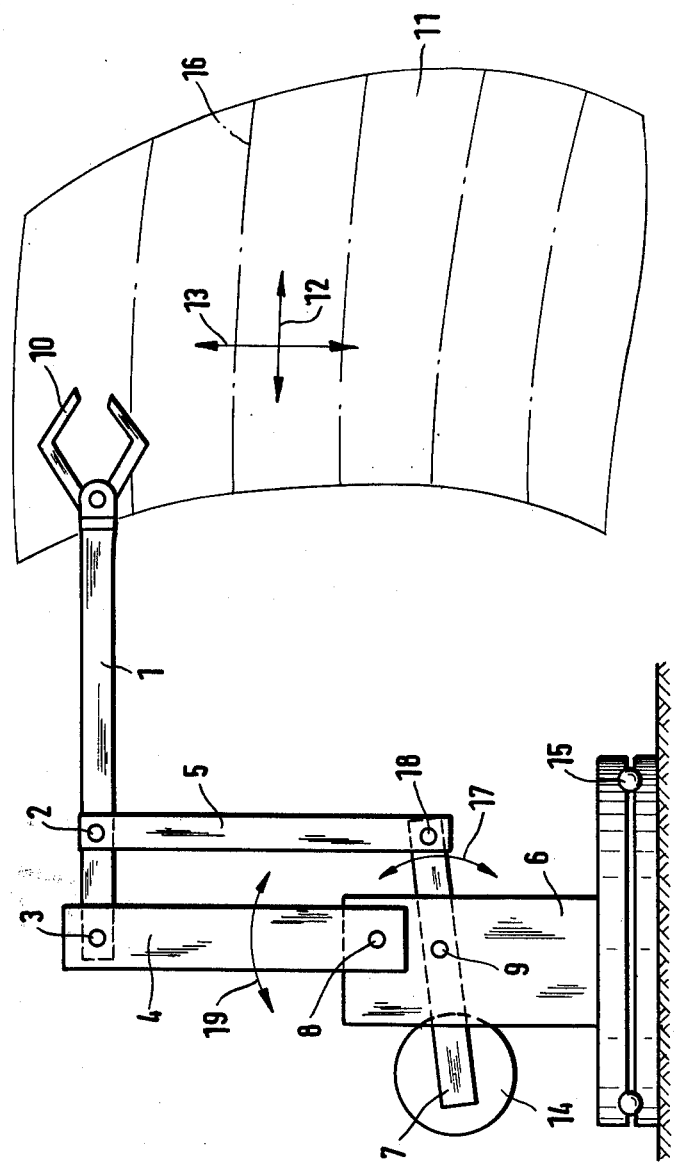

INDUSTRIAL ROBOT

BACKGROUND OF THE INVENTION

1. Field to which the Invention Relates

The invention relates to an industrial robot with a boom having a clasping member at its front end, which is engaged by two levers, of which one lever is connected via rotary joints with the boom and also with the base plate carrying the boom and the levers.

2. The Prior Art

A known industrial robot is described, for example, in the German patent (Auslegeschrift) No. 2,226,407. Industrial robots of this type of construction have a clasping member arranged on a boom. With this clasping member it is possible to carry out manipulations as for example assembly, welding, drilling, transporting and also loading and unloading.

These manipulations should be capable of being carried out as precisely as possible. The robot is driven by electric motors and in its field of operation it should be possible to reach any desired point precisely. Furthermore the robot should be capable of being aligned in accordance with six coordinates at the most, that is to say in accordance with three basic coordinates, which define movement towards the point in space, and in accordance with three clasping member coordinates, which define the alignment of the workpiece or tool at this point. The three basic coordinates are constituted by the vertical axis of rotation of the robot, a horizontal axis for horizontal movements and the vertical axis for vertical movements. Furthermore for such a robot it is necessary to make provisions to enable it to move substantial loads.

In the case of the German Pat. No. 2,226,407 the robot described has a first lever which can be rotated about a horizontal axis on the support plate. The other end of this lever is connected via a horizontal shaft with the rear end of the boom. On this lever a further lever is pivotally mounted via a horizontal shaft, which has its other end connected with the boom via a longitudinal guide. The piston rod of a cylinder makes engagement with its other lever on which the weight of the boom acts and which accordingly is to bring about weight equalization.

The point or curve control system in the known assembly is extremely complicated, since the front boom end, on which the clasping member is arranged, necessarily carries out curved movements. If for example a movement in the direction of the horizontal axis is to be carried out, it is then only possible to carry out a horizontal movement to the front or the rear of the front boom end if simultaneously the vertical movement, due to the unavoidable curve movement, of the front boom end is equalized by the use of an electric motor. As a result the control program becomes extremely complicated. Furthermore it is disadvantageous that the boom weight, that is to say the weight carried by the clasping member, cannot be automatically equalized, for example using the principle of a weighing beam.

Furthermore other industrial robots have been proposed, which however possess at least one of the above mentioned disadvantages. Frequently the speed and power factors in such robots are so unsuitable that reliable positioning is not possible.

SHORT SUMMARY OF THE INVENTION

One aim of the invention is that of so improving a robot of the initially mentioned type that the movements of the clasping member, arranged on the boom, can be performed as precisely as possible in the direction of the horizontal axis and in the direction of the vertical axis while providing weight compensation or equalization.

In the case of an industrial robot of the initially mentioned type in order to attain this and other aims the invention provides a construction in which the other lever is connected via rotary joints on the one hand with the boom and on the other hand with a pivoting lever and the pivoting lever is pivotally carried on the support plate.

One of the features which is of particular importance is that the pivoting lever on the carrying plate is carried on a fulcrum point spaced from the fulcrum point of the rotary joint of the one lever.

Owing to this feature it is possible to ensure that on pivoting the one lever the clasping member in the working field carries out a substantially horizontal movement while on pivoting of the other lever it carries out a substantially vertical movement. On the pivoting lever at the end, remote from the other lever, a weight equalizing device is provided. It can consist of a counterweight or of a cylinder which is charged with a pressure medium in accordance with the load to be supported.

Pivoting drives are connected with the levers and bring about the pivoting movement of the lever.

DESCRIPTION OF SEVERAL VIEW OF THE DRAWINGS

A preferred embodiment of the invention will now be described with reference to the accompanying drawing.

A support plate 6 is carried by a rotary ring 15 so that the robot can carry out a rotary movement about a vertical axis. A lever 4 is pivotally connected at one end with the support plate 6 via a horizontal pin 8. The other end of lever 4 is connected via a horizontal rotary joint 3, with a boom 1. Boom 1 carries at its front end a clasping member 10. On the boom 1, spaced from the rotary joint 3, there is a further rotary joint 2, to which a further lever 5 is pivoted. The other end of lever 5 is connected, via a horizontal rotary joint 18, with a pivoting lever 7, which is carried on the support plate 6 for pivoting movement about the rotary joint 9.

In the embodiment of the invention shown in the accompanying drawing the rotary joint 9 is arranged below the rotary joint 8. The other lever 5 is connected with the boom 1 between the clasping member 10 and the rotary joint 3. It is however also possible for the other lever 5 to be pivotally connected with the boom 1 at its free end behind the rotary joint 3 of the one lever 4.

At the rotary joints 8 and 9 there is a respective pivot drive, not shown, and the pivot drive at the rotary joint 8 brings about a pivoting movement 19 of the lever 4. The rotary drive provided at the rotary joint 9 brings about a pivoting movement 17 of the pivoting lever 7.

The lever lengths and the fulcrum points are so selected that in the case of a pivot movement 19 of the lever 4 the clasping member 10 forms a substantially horizontal movement in the direction of horizontal axis 12. In the case of a pivot movement 17 of the pivot lever 7 on the other hand the clasping member 10 carries out a predominantly vertical movement in the direction of the vertical axis 13. The horizontal movements, performed in the working field 11 of the clasping member 10 by virtue of pivoting movement 19 of the lever 4 are denoted by reference 16. These movements are achieved along the lines of the construction of a lemniscoid.

In lieu of a counter-weight 14, it is also possible to provide a cylinder for equilibrium compensation. The pivoting drive, not shown, of the pivoting lever 7 at the rotary joint 9 therefore does not need to perform any lifting work and is accordingly exclusively available for accelerating masses.

In the embodiment shown the other lever 5 is longer than the lever 4 and the rotary joint 9 of the pivot lever 7 lies below the rotary joint 8 of the lever 4. If on the other hand the other lever 5 is arranged on the boom 1 behind the rotary joint 3, the other lever 5 is to be made shorter than the lever 4 and the rotary joint 9 for the pivot arm 7 is to be preferred above the rotary joint 8 for the lever 4.

What I claim is:

1. A mechanical arm assembly for linearly manipulating a clasping member within pairs of orthogonally extending planes, and comprising:
    a boom arm having opposite end portions, with one end portion fixedly attached to said clasping member;
    a base assembly including a support plate having opposed first and second ends, with said first end portion attached to said base assembly for joint rotation therewith;
    a first connecting lever having a first end portion pivotally attached to said boom arm and having a second end portion pivotally attached to said support plate for moving said clasping member linearly in a first plane;
    a second connecting lever having a first end portion pivotally attached to said boom arm at a position spaced from said first connecting lever; and
    lever means attached to said second connecting lever and said support plate for moving said clasping member linearly in a second plane extending orthogonally to said first plane.

2. A mechanical arm assembly according to claim 1, wherein said first connecting lever is pivotally attached to a further end portion of said boom arm and said second connecting lever is pivotally attached to said boom arm at a position between said first connecting lever and said clasping member, with said second connecting lever constructed of a greater length than said first connecting lever.

3. A mechanical arm assembly according to claim 1, wherein said second connecting lever is pivotally attached to a further end portion of said boom arm and said first connecting lever is pivotally attached to said boom arm at a position between said second connecting lever and said clasping member, with said first connecting lever constructed of a greater length than said second connecting lever.

4. A mechanical arm assembly according to claim 1, wherein said link means comprising a link member having an end portion pivotally attached to a second end portion of said second lever and said link member having an intermediate portion pivotally attached to said support plate at a position differing from the position of attachment between said first connecting lever and said support plate,
    wherein said link member and support plate form a fulcrum point differing from a fulcrum point formed by said first lever and said support plate.

5. A mechanical arm assembly according to claim 3, wherein said link means comprises a link member having an end pivotally attached to a second end portion of said second connecting lever and having an intermediate portion pivotally attached to said support plate at a position between said first lever attachment with said support plate and the second end of said support plate.

6. A mechanical arm assembly according to claim 2, wherein said link means comprises a link member having an end pivotally attached to a second end portion of said second connecting lever and having an intermediate portion pivotally attached to said support plate at a position between said first lever attachment with said support plate and the first end of said support plate.

7. A mechanical arm assembly according to claim 4, wherein weight compensating means is fixedly attached to a further end portion of said link member.

* * * * *